(12) United States Patent
Pradel et al.

(10) Patent No.: US 7,794,806 B2
(45) Date of Patent: *Sep. 14, 2010

(54) COEXTRUSION TIE FOR POLYESTER BASED ON COGRAFTED METALLOCENE POLYETHYLENE AND LLDPE AND ON METALLOCENE POLYETHYLENE

(75) Inventors: Jean-Laurent Pradel, Bernay (FR); Fabrice Chopinez, Evreux (FR); Damien Rauline, Bernay (FR); Patrice Robert, Serquigny (FR)

(73) Assignee: Arkema France, Colombes (FR)

( * ) Notice: Subject to any disclaimer, the term of this patent is extended or adjusted under 35 U.S.C. 154(b) by 111 days.

This patent is subject to a terminal disclaimer.

(21) Appl. No.: 10/671,758

(22) Filed: Sep. 26, 2003

(65) Prior Publication Data

US 2005/0019516 A1    Jan. 27, 2005

(30) Foreign Application Priority Data

Sep. 27, 2002   (FR)   .................................... 02.11992

(51) Int. Cl.
*B32B 1/02*   (2006.01)
*B32B 1/08*   (2006.01)

(52) U.S. Cl. .................... 428/35.7; 428/34.1; 428/34.2; 428/35.9; 428/515; 428/516

(58) Field of Classification Search ................ 428/34.1, 428/34.2, 35.7, 35.9, 515, 516
See application file for complete search history.

(56) References Cited

U.S. PATENT DOCUMENTS

| 5,709,915 A | * | 1/1998 | Tomic et al. | ................ | 428/35.2 |
| 6,033,749 A | * | 3/2000 | Hata et al. | ................. | 428/36.7 |
| 6,528,587 B2 | * | 3/2003 | Robert et al. | ............... | 525/191 |

FOREIGN PATENT DOCUMENTS

| EP | 1022310 A1 | 7/2000 |
| EP | 1136536 B1 | 3/2004 |

* cited by examiner

*Primary Examiner*—Marc A Patterson
(74) *Attorney, Agent, or Firm*—Thomas F. Roland

(57) ABSTRACT

A subject matter of the invention is a coextrusion tie, which comprises:

5 to 35% by weight of a polymer (A) itself composed of a blend of 80 to 20% by weight of a metallocene polyethylene (A1) with a density of between 0.863 and 0.915 and of 20 to 80% by weight of a non-metallocene LLDPE polyethylene (A2) with a density of between 0.900 and 0.950, the blend of polymers (A1) and (A2) being cografted;

95 to 65% by weight of metallocene polyethylene (B) homo- or copolymer, the comonomer of which comprises 3 to 20 carbon atoms, preferably 4 to 8 carbon atoms, the density of which is between 0.863 and 0.915 and the MFI of which is between 0.5 and 30, preferably between 3 and 15, g/10 min;

the total forming 100%, the blend of (A) and (B) being such that its MFI is between 0.1 and 15, preferably between 1 and 13, g/10 min.

12 Claims, No Drawings

COEXTRUSION TIE FOR POLYESTER BASED ON COGRAFTED METALLOCENE POLYETHYLENE AND LLDPE AND ON METALLOCENE POLYETHYLENE

This application claims benefit, under U.S.C. §119 or §365 of French Application Number 02/11992, filed Sep. 27, 2002.

FIELD OF THE INVENTION

The present invention relates to a coextrusion tie which adheres to polyester layers and which comprises a blend of metallocene polyethylene, abbreviated to mPE in the continuation of the text, of non-metallocene LLDPE, both cografted, and of ungrafted metallocene polyethylene. The invention also relates to the multilayer structure comprising this tie and to the objects comprising such a structure.

BACKGROUND OF THE INVENTION

To date, the adhesives for binding layers or films made of PE or made of polyester were based on ethylene/alkyl (meth) acrylate and/or ethylene/vinyl acetate copolymers. However, these adhesives have the disadvantages of giving off a strong smell, which presents operating problems. Moreover, their adhesiveness is not in particular very effective and, in any case, not in duration. These adhesives also have the disadvantages of not allowing the adhesion of polyester or polyolefin layers to EVOH (barrier material) layers.

The document FR 2 806 734 of the Applicant Company discloses a composition comprising metallocene PE and non-metallocene LLDPE which are cografted with unsaturated carboxylic acid or its derivative, said composition being diluted in PE or an elastomer. The PE being able [sic], in this application, to be a PE homopolymer or copolymer with, in this case, an α-olefin for comonomer and it can be a PE of HDPE (high density PE), LDPE (low density PE), LLDPE (linear low density PE) for VLDPE (very low density PE) type or a metallocene PE. No information or examples are given with regard to the diluent when the latter proves to be metallocene PE.

The Applicant Company has now found a tie which no longer presents olfactory problems like the ties of the former generation and which exhibits a significant adhesiveness from its application which increases until a plateau is reached. Furthermore, this adhesive adheres to EVOH (barrier material) layers, contrary to the adhesives of ethylene/alkyl (meth) acrylate or ethylene/vinyl acetate type.

This tie exhibits adhesion characteristics which are not described in the other documents of the prior art. These characteristics are described later in the present document.

The tie is recovered in the form of granules at the outlet of an extruder or of any other equivalent device; the Applicant Company has found that this granulation was much easier than for the ties of ethylene/vinyl acetate type which are grafted.

This tie thus makes possible the preparation of varied structures comprising, inter alia, a polyethylene layer, a polyester layer and/or a barrier material layer. A person skilled in the art will adapt the choice of the polyester according to the conversion method chosen.

These structures are of use in the manufacture of flexible or rigid packagings, such as bags, bottles, containers, pipes, coextruded hoses, or multilayer gas tanks for vehicles.

SUMMARY OF THE INVENTION

A subject matter of the invention is a coextrusion tie, which comprises:
- 5 to 35% by weight of a polymer (A) itself composed of a blend of 80 to 20% by weight of a metallocene polyethylene (A1) with a density of between 0.863 and 0.915 and of 20 to 80% by weight of a non-metallocene LLDPE polyethylene (A2) with a density of between 0.900 and 0.950, the blend of polymers (A1) and (A2) being cografted by a grafting monomer chosen from unsaturated carboxylic acids and their derivatives, the content of the grafting monomer in said blend being between 30 and 100 000 ppm, preferably between 600 and 5 000 ppm;
- 95 to 65% by weight of metallocene polyethylene (B) homo- or copolymer, the comonomer of which comprises 3 to 20 carbon atoms, preferably 4 to 8 carbon atoms, the density of which is between 0.863 and 0.915 and the MFI, melt flow index, of which, measured under 2.16 kg at 190° C. according to Standard ASTM D 1238, is between 0.5 and 30, preferably between 3 and 15, g/10 min;

the total forming 100%, the blend of (A) and (B) being such that its MFI is between 0.1 and 15, preferably between 1 and 13, g/10 min.

According to one embodiment, the adhesive strength of the tie is increased by 5 to 50% between the time t=0 corresponding to its application immediately after its extrusion and the time t=8 days.

According to one embodiment, the grafting monomer for the tie is maleic anhydride.

According to one embodiment, the tie additionally comprises an ethylene/alkyl (meth)acrylate copolymer (C).

According to one embodiment, the MFI of (A) for the tie is between 0.1 and 5 g/10 min (ASTM D 1238 at 190° C. under 2.16 kg).

Another subject matter of the invention is a multilayer structure, which comprises a layer (L) comprising the tie described above and a layer (E) directly attached to one of the two faces of said layer (L), said layer (E) being a polyolefin or polyester layer.

According to one embodiment, in the multilayer structure, a layer (F) is directly attached to the second face of the layer (L), the layer (L) being sandwiched between the layers (E) and (F), said layer (F) being either a polymer layer, the polymer being chosen from the group of the polyamides, saponified copolymers of ethylene and of vinyl acetate (EVOH), polyolefins and polyesters, or a metal layer.

The invention additionally relates to an object comprising a structure described above and to the use of the structure in manufacturing films or sheets.

DETAILED DESCRIPTION OF THE INVENTION

The invention will now be described in detail.

As regards (A1), the term "metallocene polyethylene" denotes the polymers obtained by copolymerization of ethylene and of an α-olefin having from 3 to 30 carbon atoms, preferably from 3 to 8 carbon atoms, such as, for example, propylene, butene, pentene, hexene or octene, in the presence of a single-site catalyst.

Examples of α-olefins having 3 to 30 carbon atoms as possible comonomers comprise propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-icocene [sic], 1-dococene [sic], 1-tetracocene [sic], 1-hexacocene [sic], 1-octacocene [sic] and 1-triacontene. These α-olefins can be used alone or as a mixture of two or of more than two.

A single-site catalyst is generally composed of an atom of a metal which can be, for example, zirconium or titanium and of two cyclic alkyl molecules bonded to the metal. More specifically, the metallocene catalysts are usually composed of two cyclopentadiene rings bonded to the metal. These catalysts are frequently used with aluminoxanes as cocatalysts or activators, preferably methylaluminoxane (MAO). Hafnium can also be used as metal to which the cyclopentadiene is attached. Other metallocenes can include transition metals from Groups IVA, VA and VIA. Metals from the lanthanide series can also be used.

These metallocene polyethylenes can also be distinguished by their $\overline{Mw}/\overline{Mn}$ ratio <3 and preferably <2, in which $\overline{Mw}$ and $\overline{Mn}$ respectively denote the weight-average molar mass and the number-average molar mass. The term "metallocene polyethylene" also denotes those having an MFR (Melt Flow Ratio) of less than 6.53 and an $\overline{Mw}/\overline{Mn}$ ratio of greater than MFR minus 4.63. MFR denotes the ratio of the $MFI_{10}$ (MFI under a load of 10 kg) to the $MFI_2$ (MFI under a load of 2.16 kg). Other metallocene polyethylenes are defined by an MFR equal to or greater than 6.13 and an $\overline{Mw}/\overline{Mn}$ ratio of less than or equal to MFR minus 4.63.

Advantageously, the density of (A1) is between 0.863 and 0.915. The MFI of the mPE (A1) is between 0.5 and 30 g/10 min (according to Standard ASTM D1238 at 190° C. under 2.16 kg).

As regards (A2), the polymer (A2) is a copolymer of ethylene and of an α-olefin of LLDPE (linear low density polyethylene) type and is not of metallocene type. The α-olefins advantageously have from 3 to 30 carbon atoms. The list of these α-olefins has already been given above. They are preferably α-olefins having from 3 to 8 carbon atoms.

The density of (A2) is advantageously between 0.900 and 0.950.

The MFI or melt flow index of (A2) is between 0.1 and 8 g/10 min (according to Standard ASTM D1238 at 190° C. under 2.16 kg).

The blend of the polymers (A1) and (A2) is grafted with a grafting monomer, that is to say that the polymers (A1) and (A2) are cografted. The grafting monomer is chosen from unsaturated carboxylic acids or their functional derivatives.

Examples of unsaturated carboxylic acids are those having 2 to 20 carbon atoms, such as acrylic, methacrylic, maleic, fumaric and itaconic acids. The functional derivatives of these unsaturated carboxylic acids comprise the anhydrides, the ester derivatives, the amide derivatives, the imide derivatives and the metal salts (such as the alkali metal salts) of these unsaturated carboxylic acids.

Unsaturated dicarboxylic acids having 4 to 10 carbon atoms and their functional derivatives, particularly their anhydrides, are particularly preferred grafting monomers.

These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and their functional derivatives and maleic, itaconic, citraconic, allylsuccinic, cyclohex-4-ene-1,2-dicarboxylic, 4-methylenecyclohex-4-ene-1,2-dicarboxylic [sic], bicyclo[2.2.1]hept-5-ene-2,3-dicarboxylic and x-methylbicyclo[2.2.1]hept-5-ene-2,2-dicarboxylic [sic] anhydrides.

Examples of other grafting monomers comprise $C_1$-$C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids, such as acrylamide, methacrylamide, maleic acid monoamide, maleic acid diamide, maleic acid N-monoethylamide, maleic acid N,N-diethylamide, maleic acid N-monobutylamide, maleic acid N,N-dibutylamide, fumaric acid monoamide, fumaric acid diamide, fumaric acid N-monoethylamide, fumaric acid N,N-diethylamide, fumaric acid N-monobutylamide and fumaric acid N,N-dibutylamide; amide derivatives of unsaturated carboxylic acids, such as maleimide, N-butylmaleimide and N-phenylmaleimide; and metal salts of unsaturated carboxylic acids, such as sodium acrylate, sodium methacrylate, potassium acrylate and potassium methacrylate. Maleic anhydride is preferred.

Various known processes can be used to graft a grafting monomer to the blend of polymers (A1) and (A2). The blend can comprise the additives generally used during the processing of polyolefins at contents of between 10 ppm and 50 000 ppm, such as antioxidants based on substituted phenolic molecules, UV stabilizers, processing aids, such as fatty amides, stearic acid and its salts, fluoropolymers known as agents for preventing extrusion defects, amine-based antifogging agents, antiblocking agents, such as silica or talc, masterbatches with dyes, and nucleating agents, inter alia.

For example, the grafting can be carried out by heating the polymers (A1) and (A2) at high temperature, approximately 150° C. to approximately 300° C., in the presence or in the absence of a solvent and with or without radical initiator. Appropriate solvents which can be used in this reaction are benzene, toluene, xylene, chlorobenzene or cumene, inter alia. Appropriate radical initiators which can be used comprise t-butyl hydroperoxide, cumene hydroperoxide, diisopropylbenzene hydroperoxide, di(t-butyl) peroxide, t-butyl cumyl peroxide, dicumyl peroxide, 1,3-bis(t-butylperoxyisopropyl)benzene, acetyl peroxide, benzoyl peroxide, isobutyryl peroxide, bis(3,5,5-trimethylhexanoyl) peroxide and methyl ethyl ketone peroxide.

In the blend of polymers (A1) and (A2) modified by grafting obtained in the abovementioned way, the amount of the grafting monomer can be appropriately chosen but it is preferably from 0.01 to 10% by weight, that is to say preferably from 600 ppm to 5 000 ppm, with respect to the weight of cografted (A1) and (A2).

The amount of the monomer grafted is determined by quantitative determination of the succinic functional group by FTIR spectroscopy. The MFI or melt flow index of (A), that is to say of the blend of (A1) and (A2) which have been cografted, is between 0.1 and 15 g/10 min (ASTM D 1238, 190° C., 2.16 kg), advantageously between 0.1 and 5 g/10 min, preferably between 0.1 and 3 g/10 min.

As regards the polyethylene (B), it is a metallocene polyethylene homopolymer or copolymer with, in this case, a comonomer chosen from α-olefins having from 3 to 20 carbon atoms, preferably from 4 to 8 carbon atoms.

Examples of α-olefins having from 3 to 20 carbon atoms comprise propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene or 1-icocene [sic]. These α-olefins can be used alone or as a mixture of two or of more than two.

The metallocene polyethylene (B) has a density of between 0.863 and 0.915 and an MFI (measured according to Standard ASTM D 1238 at 190° C. under 2.16 kg) of between 0.5 and 30 g/10 min, preferably between 3 and 15 g/10 min.

The MFI of the coextrusion tie is between 0.1 and 15 g/10 min, preferably between 1 and 13 g/10 min (ASTMD 1238, 190° C., 2.16 kg).

The ties of the invention are of use for multilayer structures, such as, for example, films, sheets, pipes and hollow bodies.

The multilayer structure of the present invention comprises a layer (L) comprising the tie described above and a layer (E) directly attached to a first face of said layer (L). The layer (E) is a layer of polymers chosen from polyolefins and polyesters.

A layer (F) can also be directly attached to the second face of the layer (L), the layer (L) being sandwiched between the layers (E) and (F), said layer (F) being either a polymer layer, the polymer being chosen from the group of the polyamides and saponified copolymers of ethylene and of vinyl acetate (EVOH), or a metal layer.

However, the multilayer structure can also comprise a layer (L) comprising the tie sandwiched between two layers (F).

The following structures can be listed by way of example: PA denoting polyamide, L the tie, PE polyethylene, PET poly(ethylene terephthalate) and EVOH the saponified copolymer of ethylene and of vinyl acetate:

structures of type layer (E)/layer (L)/layer (F): PE/L/EVOH/L/PET, PE/L/PA or PE/L/PA/L/PE, and;

structures of type [lacuna] (E)/layer (L)/layer (E) and layer (F)/layer (L)/layer (F): PET/L/PE, PE/L/PE, PET/L/PET or PA/L/PA, mixed structures: PE/L/EVOH/L/PA.

More specifically, the polyamides are long-chain synthetic polyamides having structural units of the amide group in the main chain, such as PA-6, PA-6,6, PA-6,10, PA-11, PA-6/6,6 and PA-12.

The saponified copolymers of ethylene and of vinyl acetate have a degree of saponification of approximately 90 to 100 mol % and are obtained by saponifying an ethylene/vinyl acetate copolymer having an ethylene content of approximately 15 to approximately 60 mol %.

The polyesters are homo- or copolymers. The homopolyesters can be taken from the group of poly(ethylene terephthalate), poly(butylene terephthalate) and poly(ethylene naphthenate) or aromatic polyesters, such as polymeric liquid crystals.

Appropriate copolyesters of use in the invention can be formed from aromatic dicarboxylic acids, from dicarboxylic acid esters, from dicarboxylic ester [sic] anhydrides, from glycols or from their mixtures. Partially aromatic copolyesters formed from repeat units comprising terephthalic acid, dimethyl terephthalate, isophthalic acid, dimethyl isophthalate, dimethyl 2,6-naphthalenedicarboxylate, 2,6-naphthalenedicarboxylic acid, 1,2-, 1,3- and 1,4-phenylenedioxydiacetic acids, ethylene glycol, diethylene glycol, 1,4-cyclohexanedimethanol, 1,4-butanediol or their mixtures are also appropriate.

Preferably, the structure of the polyesters comprises repeat units comprising terephthalic acid, dimethyl terephthalate, isophthalic acid, dimethyl isophthalate and/or dimethyl 2,6-naphthalenedicarboxylate. The dicarboxylic acid of the polyester can be modified with one or more different dicarboxylic acids (preferably up to approximately 20 mol %). Such dicarboxylic acids comprise aromatic dicarboxylic acids preferably having 8 to 14 carbon atoms, aliphatic dicarboxylic acids preferably having 4 to 12 carbon atoms or cycloaliphatic dicarboxylic acids preferably having 8 to 12 carbon atoms. The examples of dicarboxylic acids are: terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid or their mixtures.

Furthermore, the glycol can be modified with one or more different diols other than ethylene glycol (preferably up to approximately 20 mol %). Such diols comprise: cycloaliphatic diols preferably having 6 to 20 carbon atoms or aliphatic diols preferably having 25 [sic] to 20 carbon atoms. The examples of such diols comprise: diethylene glycol, triethylene glycol, 1,4-cyclohexanedimethanol, propane-1,3-diol, butane-1,4-diol, pentane-1,5-diol, hexane-1,6-diol, 3-methylpentane-2,4-diol, 2-methylpentane-1,4-diol, 2,2,4-trimethylpentane-1,3-diol, 2-ethylhexane-1,3-diol, 2,2-diethylpropane-1,3-diol, hexane-1,3-diol, 1,4-di(hydroxyethoxy)benzene, 2,2-bis(4-hydroxycyclohexyl)propane, 2,4-dihydroxy-1,1,3,3-tetramethylcyclobutane, 2,2-bis(3-hydroxyethoxyphenyl)propane, 2-bis(4-hydroxypropoxyphenyl)propane [sic], (hydroxyethyl) resorcinol or their mixtures. The polyesters can be prepared with two or more than two of the above diols.

The metal layer can be, for example, a film or a sheet of a metal, such as aluminum, iron, copper, tin and nickel, or an alloy comprising at least one of these metals as main constituent. The thickness of the film or of the sheet can be suitably chosen and it is, for example, from approximately 0.01 to approximately 0.2 mm. It is common practice to degrease the surface of the metal layer before rolling the tie of the invention onto it.

The compositions forming the various layers of the structures of the invention can comprise additives, such as fillers, stabilizers, slip agents, antistatic agents or flame retardants.

The structures of the invention can be manufactured by coextrusion, extrusion-blow molding, thermoforming, film coating or rolling processes known in the field of thermoplastics.

EXAMPLES

The tie compositions according to the invention (Ex. 1-4) and the comparative compositions (Comp. 1-7) are combined in Table 1 below.

The peel strength F in N/15 mm at t0 (time=0, when the tie has just been extruded and applied to the test specimen) and at t8 (corresponding to time=8 days) are combined in Table 2 below. The films used for these tests are coextruded films composed of 3 layers for case 1: PET layer/tie layer (L)/PE layer, with respective thicknesses of 150/30/350 in µm, and films composed of 5 layers for cases 2 and 3: PET layer/tie layer (L)/EVOH layer/tie layer (L)/PE layer, with respective thicknesses of 150/30/20/30/300 in µm.

The peel tests were carried out at a temperature T of 25° C. and at a peel rate of 200 mm/min. VORIDIAN 9921W PET from Eastman, LACQTENE LD0304 LDPE from Atofina and SOARNOL EVOH, comprising 38% of ethylene, from Nippon Gohsei were used to prepare these films. The symbol σ corresponds to the standard deviation.

TABLE 1

|  |  | Ex. 1 | | Ex. 2 | | Ex. 3 | | Ex. 4 | |
| --- | --- | --- | --- | --- | --- | --- | --- | --- | --- |
| Characteristics of the cografted polymer (A) | Type of PE | mPE | LLDPE | mPE | LLDPE | mPE | LLDPE | mPE | LLDPE |
| | Density (g/cm$^3$) | 0.87 | 0.92 | 0.87 | 0.92 | 0.87 | 0.92 | 0.87 | 0.92 |
| | Comonomer | 1-octene | 1-butene | 1-octene | 1-butene | 1-octene | 1-butene | 1-octene | 1-butene |
| | Composition | 50% | 50% | 50% | 50% | 50% | 50% | 50% | 50% |
| | Degree of grafting | 0.9% | | 0.9% | | 0.9% | | 0.9% | |
| | Grafting monomer | MAH | | MAH | | MAH | | MAH | |
| | MFI (g/10 min) 190° C., 2.16 kg | 0.7 | | 0.7 | | 0.7 | | 0.7 | |
| Proportion of (A) | | 15% | | 25% | | 15% | | 25% | |
| Characteristics of the polymer (B) | Type of mPE | E/1-octene | | E/1-octene | | E/1-octene | | E/1-octene | |
| | Density (g/cm$^3$) | 0.870 | | 0.870 | | 0.902 | | 0.902 | |
| | MFI (g/10 min) 190° C., 2.16 kg | 5 | | 5 | | 10 | | 10 | |
| Proportion of (B) | | 85% | | 75% | | 85% | | 75% | |
| MFI of the blend (A) and (B) | | 3 | | 2.5 | | 5.5 | | 4.5 | |

|  |  | Comp. 1 | | Comp. 2 | | Comp. 3 | | Comp. 4 | |
| --- | --- | --- | --- | --- | --- | --- | --- | --- | --- |
| Characteristics of the cografted polymer (A) | Type of PE | mPE | LLDPE | mPE | LLDPE | mPE | LLDPE | mPE | LLDPE |
| | Density (g/cm$^3$) | 0.87 | 0.92 | 0.87 | 0.92 | 0.87 | 0.92 | 0.87 | 0.92 |
| | Comonomer | 1-octene | 1-butene | 1-octene | 1-butene | 1-octene | 1-butene | 1-octene | 1-butene |
| | Composition | 50% | 50% | 50% | 50% | 50% | 50% | 50% | 50% |
| | Degree of grafting | 0.9% | | 0.9% | | 0.9% | | 0.9% | |
| | Grafting monomer | MAH | | MAH | | MAH | | MAH | |
| | MFI (g/10 min) 190° C., 2.16 kg | 0.7 | | 0.7 | | 0.7 | | 0.7 | |
| Proportion of (A) | | 25% | | 25% | | 15% | | 25% | |
| Characteristics of the polymer (B) | Type of mPE | E/Me acrylate | | E/vinyl acetate | | E/Me acrylate and mPE** | | VLDPE (E/1-octene) | |
| | Density (g/cm$^3$) | 0.943 | | 0.950* | | 0.943 and 0.902** | | 0.911 | |
| | MFI (g/10 min) 190° C., 2.16 kg | 8 | | 20 and 3* | | 8 and 10** | | 6.6 | |
| Proportion of (B) | | 75% | | 75% | | 85%** | | 75% | |
| MFI of the blend (A) and (B) | | | | | | | | | |

|  |  | Comp. 5 | | Comp. 6 | | Comp. 7 | |
| --- | --- | --- | --- | --- | --- | --- | --- |
| Characteristics of the cografted polymer (A) | Type of PE | mPE | LLDPE | mPE | LLDPE | mPE | LLDPE |
| | Density (g/cm$^3$) | 0.87 | 0.92 | 0.87 | 0.92 | 0.87 | 0.92 |
| | Comonomer | 1-octene | 1-butene | 1-octene | 1-butene | 1-octene | 1-butene |
| | Composition | 50% | 50% | 50% | 50% | 50% | 50% |
| | Degree of grafting | 0.9% | | 0.9% | | 0.9% | |
| | Grafting monomer | MAH | | MAH | | MAH | |
| | MFI (g/10 min) 190° C., 2.16 kg | 0.7 | | 0.7 | | 0.7 | |
| Proportion of (A) | | 25% | | 25% | | 25% | |
| Characteristics of the polymer (B) | Type of mPE | LLDPE (E/1-octene) | | LDPE | | HDPE | |
| | Density (g/cm$^3$) | 0.919 | | 0.924 | | 0.955 | |
| | MFI (g/10 min) 190° C., 2.16 kg | 4.4 | | 2 | | 4 | |
| Proportion of (B) | | 75% | | 75% | | 75% | |
| MFI of the blend (A) and (B) | | | | | | | |

*37.5% of E/vinyl acetate copolymer with MFI = 20 and d = 0.950, and 37.5% of E/vinyl acetate copolymer with MFI = 3 and d = 0.950;

**42.5% of E/methyl acrylate copolymer with MFI = 8 and d = 0.943, and 42.5% of mPE with 1-octene as comonomer and MFI = 10 and d = 0.902

TABLE 2

| | CASE 1 | | | | CASE 2 | | | | CASE 3 | | | |
| --- | --- | --- | --- | --- | --- | --- | --- | --- | --- | --- | --- | --- |
| | F at t0 in N/15 mm | σ | F at t8 in N/15 mm | σ | F at t0 in N/15 mm | σ | F at t8 in N/15 mm | σ | F at t0 in N/15 mm | σ | F at t8 in N/15 mm | σ |
| Ex. 1 | 13.4 | 0.5 | 16.7 | 0.7 | 8.2 | 0.2 | 10.7 | 0.1 | — | — | — | — |
| Ex. 2 | 14.2 | 0.5 | 17.8 | 0.4 | 10.6 | 0.3 | 12.8 | 0.4 | — | — | — | — |
| Ex. 3 | 11.6 | 0.6 | 15.1 | 3.4 | 8.5 | 0.1 | 10.1 | 0.2 | — | — | — | — |
| Ex. 4 | 12.5 | 0.8 | 20.1 | 1.8 | 10.4 | 0.2 | 12.1 | 0.3 | — | — | — | — |
| Comp. 1 | 6 | 0.5 | 5.6 | 0.4 | — | — | — | — | 5.8 | 0.5 | 5.2 | 0.4 |
| Comp. 2 | 6.1 | 0.5 | 6.6 | 0.9 | — | — | — | — | 5.7 | 0.2 | 5.8 | 0.4 |
| Comp. 3 | 6.5 | 0.9 | 6.8 | 0.8 | — | — | — | — | 6.2 | 0.9 | 6.1 | 0.8 |
| Comp. 4 | 4.4 | 2.1 | 1.3 | 0.2 | — | — | — | — | 4.1 | 1 | 2.1 | 0.2 |
| Comp. 5 | 3.2 | 0.3 | 1.2 | 0.2 | — | — | — | — | 3.2 | 0.1 | 1.4 | 0.2 |

TABLE 2-continued

|  | CASE 1 | | | | CASE 2 | | | | CASE 3 | | | |
| --- | --- | --- | --- | --- | --- | --- | --- | --- | --- | --- | --- | --- |
|  | F at t0 in N/15 mm | σ | F at t8 in N/15 mm | σ | F at t0 in N/15 mm | σ | F at t8 in N/15 mm | σ | F at t0 in N/15 mm | σ | F at t8 in N/15 mm | σ |
| Comp. 6 | 2.6 | 0.2 | 1 | 0.1 | — | — | — | — | 2.7 | 0.2 | 1.2 | 0.1 |
| Comp. 7 | 1.2 | 0.1 | 0.5 | 0.1 | — | — | — | — | 1 | 0.1 | 0.6 | 0.1 |

Case 1: Failure between the PET layer and the tie layer (L)
Case 2: Failure between the EVOH layer and the tie layer (L)
Case 3: Failure between the PET layer and the tie layer (L)

What is claimed is:

1. A multilayer structure, which comprises a coextrusion tie layer (L) comprising
    5 to 35% by weight of a polymer (A) itself composed of a blend of 80 to 20% by weight of a metallocene polyethylene (A1) with a density of between 0.863 and 0.915 and of 20 to 80% by weight of a non-metallocene LLDPE polyethylene (A2) with a density of between 0.900 and 0.950, the blend of polymers (A1) and (A2) being cografted by a grafting monomer chosen from unsaturated carboxylic acids and their derivatives, the content of the grafting monomer in said blend being between 30 and 100 000 ppm;
    95 to 65% by weight of metallocene polyethylene (B) homo- or copolymer, the comonomer of which comprises 3 to 20 carbon atoms, the density of which is within a range in which the minimum density of the range is 0.863 and the upper density value of the range is 0.902 and the MFI, melt flow index, of which, measured under 2.16 kg at 190° C. according to Standard ASTMD 1238, is between 0.5 and 30, g/10 min;
the total forming 100%, the blend of (A) and (B) being such that its MFI is between 0.1 and 15, g/10 min, and wherein the adhesive strength of said coextrusion tie is increased by 5 to 50% between the time t=0 corresponding to its application immediately after its extrusion and the time t=8 days;
    and a layer (E) directly attached to one of the two faces of said layer (L), said layer (E) being a polyester layer.

2. The multilayer structure as claimed in claim 1, wherein the grafting monomer is maleic anhydride.

3. The multilayer structure as claimed in claim 1, which additionally comprises an ethylene/alkyl (meth)acrylate copolymer (C).

4. The multilayer structure as claimed in claim 1, wherein the MFI of A is between 0.1 and 5 g/10 min (ASTMD 1238 at 190° C. under 2.16 kg).

5. The multilayer structure as claimed in claim 1, wherein a layer (F) is directly attached to the second face of the layer (L), the layer (L) being sandwiched between the layers (E) and (F), said layer (F) being either a polymer layer, the polymer being chosen from the group of the polyamides, saponified copolymers of ethylene and of vinyl acetate (EVOH), polyolefins and polyesters, or a metal layer.

6. The multilayer structure as claimed in claim 5, wherein the layer (F) is an EVOH layer.

7. An object, which comprises a structure as claimed in claim 1.

8. The object as claimed in claim 7, which is a bag, a bottle, a container, a film, a sheet, a pipe or a hose.

9. The multilayer structure as claimed in claim 1, wherein said metallocene polyethylene (B) copolymer comonomer comprises 4 to 8 carbon atoms.

10. The multilayer structure as claimed in claim 1, wherein said metallocene polyethylene (B) has an MFI, melt flow index, of which, measured under 2.16 kg at 190° C. according to Standard ASTMD 1238, is between 3 and 15, g/10 min.

11. The multilayer structure as claimed in claim 1, wherein the blend of (A) and (B) being such that its MFI is between 1 and 13 g/10 min.

12. The multilayer structure as claimed in claim 1, wherein the content of the grafting monomer in said polymer blend (A) is between 600 and 5 000 ppm.

* * * * *